HOUSING FOR ELECTRONIC EQUIPMENT

Filed March 4, 1959 4 Sheets-Sheet 1

INVENTOR.
Dominic Errichiello,
BY Mueller & Aichele
Attys.

INVENTOR.
Dominic Errichiello,
BY
Mueller & Aichele
Attys.

HOUSING FOR ELECTRONIC EQUIPMENT

Filed March 4, 1959 4 Sheets-Sheet 3

INVENTOR.
Dominic Errichiello,
BY
Mueller, & Aichele
Att'ys.

HOUSING FOR ELECTRONIC EQUIPMENT

Filed March 4, 1959

INVENTOR.
Dominic Errichiello,
BY Mueller & Aichele
Attys.

United States Patent Office 3,048,747

Patented Aug. 7, 1962

3,048,747

HOUSING FOR ELECTRONIC EQUIPMENT

Dominic Errichiello, Melrose Park, Ill., assignor to Motorola, Inc., Chicago, Ill., a corporation of Illinois Filed Mar. 4, 1959, Ser. No. 797,265
9 Claims. (Cl. 317—101)

This invention relates generally to mountings and housings for electronic equipment and more particularly to improved chassis and housing structures for communications equipment for use in aircraft.

In modern aircraft where a premium is placed on space and weight there is a constant demand for electronic equipment which is compact, easily accessible and lightweight, yet which is provided in housings of standardized configurations and securely mounted to withstand severe shock and vibration. Since there is a limited choice of locations in which to mount electronic equipment in aircraft, it is desirable that such units be adapted for installation in different positions and be accessible from various directions. It is also desirable that the equipment be mounted and housed so as to facilitate testing and servicing either when installed or removed, whether on the ground or while in flight. Of course, the most reliable and least expensive housing and mounting structures are preferred.

It is therefore an object of the invention to provide a housing for electronic equipment which facilitates installation, maintenance and removal of the equipment therein.

A further object of the invention is to provide a housing which is simple and inexpensive to construct, and which is strong, compact and lightweight.

Another object of the invention is to provide an improved chassis for unitized electronic equipment which facilitates mounting a plurality of units, which has increased strength in proportion to the number of units mounted in the assembly, and wherein each unit is electrically and mechanically independent of the other units.

A feature of the invention is the provision of a simple, easily manufactured multiple piece housing which can be disassembled with a minimum of effort to allow electronic chassis contained therein to be removed from the top, sides or front thereof.

Another feature of the invention is the provision of a multiple piece housing which can be partially disassembled in stages to allow progressive access to the component parts of electronic equipment contained therein.

A further feature of the invention is the provision of an electronic signaling assembly in which a plurality of signaling units, such as the selective signaling decoder units described in the particular application hereafter disclosed, are each mounted on an individual vertical chassis with all the parts of a unit mounted on one side thereof. Each unit is thus mechanically and electrically shielded from the adjacent units by the chassis itself, and each unit is independently mounted and wired to permit testing or removal of individual units without connection to or disconnection from the other units mounted therewith.

Still another feature of the invention is the provision of an electronic signaling assembly having a housing including a cover plate which cooperates with an unmounted edge of each vertical signaling chassis contained in the housing by means of simple fasteners insertable therethrough to engage said edge. This fastening arrangement serves to hold the cover plate on the housing while also fastening and structurally incorporating each chassis into the housing.

Yet another feature of this invention is the provision of a housing having an envelope member with wrap-around side, top and front panels, which is slidably or liftably removable from equipment in the housing without requiring the removal of control knobs from such equipment, and which may be attached to the housing base by a single fastener.

The invention provides a housing and chassis arrangement for electronic equipment including an L-shaped base member having bottom and back portions and a four-sided envelope member open at the bottom and rear end to fit on and enclose the base member. The bottom portion of the base member supports electronic equipment mounted on vertical chassis within the housing. The back portion of the base member is adapted to carry multiple connector units for separately connecting each chassis to external electrical systems. A peripheral grooved edge is provided around the sides and top of the base member to receive the edges of the envelope member and forms a seal therewith when the envelope member is assembled on the base member. The grooved edge may be provided by forming a lip on the edges of the base and securing angle members thereto having lips spaced from the lips on the base. The envelope may be fastened to the base member by simple fastening means inserted through the front end of the envelope and engaging a front portion on the base to clamp the envelope in the grooved edges of the base member. Simple fastening means may be inserted through the top of the envelope to simultaneously engage and secure the upper edges of each vertical chassis mounted on the base member and clamp the envelope in the grooved edges of the base member. The top fastening means may also serve to secure a cover plate included in the housing arrangement when the top side of the envelope is provided with an opening for partial access to the electrical equipment enclosed therein.

Figures 1, 2:
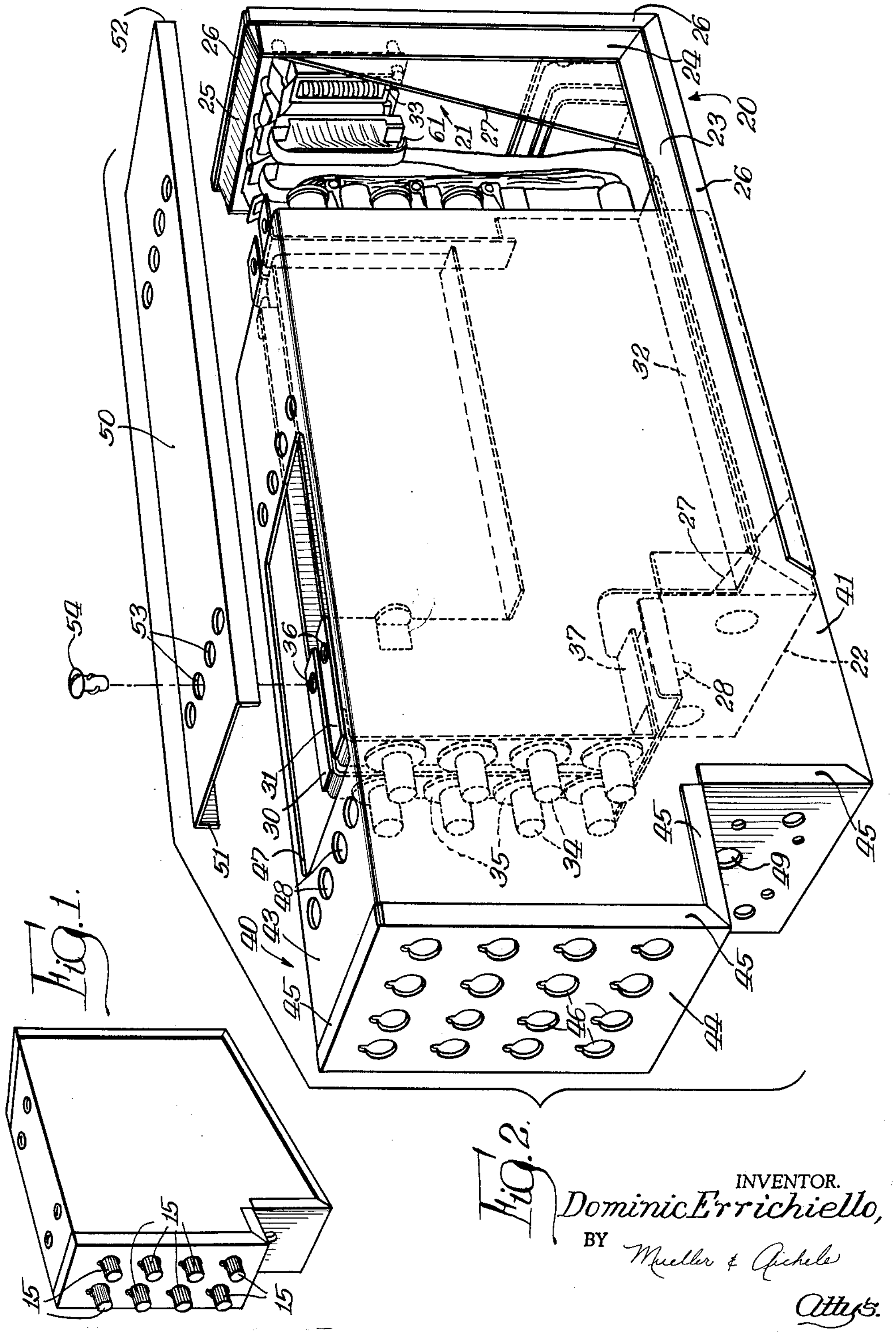
FIG. 1 is a perspective view of an assembled unit with a housing embodying the invention.
FIG. 2 is an exploded perspective view of a signaling unit including a housing embodying the invention.

A housing in accordance with the invention is shown generally in FIG. 1. This particular embodiment of the invention is a size which will house two signaling decoder units. The decoder units are contained completely within the housing, with the exception of control knobs 15 of the decoder units which extend through openings in the front of the housing.

FIG. 2 illustrates in more detail a housing constructed in accordance with the invention which will enclose a maximum of four decoder units. It is apparent from this view that other housings may be constructed in accordance with the invention which will accommodate a greater or lesser number of decoder units with equal facility. The various elements of the housing structure are shown in a partially exploded position in order to illustrate how they fit and cooperate with one another when assembled. An L-shaped base member 20 of sheet metal construction may be formed from a one-piece pattern to provide a back 21 and a bottom 22. The front end of base member 20 is step-shaped so that the bottom will be short enough to meet standard aircraft mounting specifications while permitting the housing at a level above the bottom to be longer than the bottom. A fastener hole 28 is provided at the center of the riser portion of this stepped front end. The side edges of the bottom and the back are provided with lip portions 23 and 24 respectively which are bent inwardly at right angles to the main surfaces. The right side lip edges 23 and 24 are shown in the view of FIG. 2. Similarly, a lip is provided along the top edge of the back 21 which is bent inwardly about 80 to 85° with the main surface thereof to form the lip edge 25.

Right angle flange members 26, constructed of sheet metal, encompass the side edges of the bottom 22 and the side and top edges of the back 21 and are secured by spot welds to the periphery of the main surfaces of the bottom 22 and back 21. The lips of the angle members 26, being those surfaces which project inwardly at right angles to the main surfaces of the back 21 and the bottom 22, are spaced from, and parallel to, the lip edges 23 and 24 of the sides of the bottom 22 and of the back 21. Along the top of the back 21 the inwardly projecting lip of the angle member 26 is likewise spaced from the lip edge 25. Thus, a continuous groove or channel is formed between the lip edges of the back 21 and bottom 22 and the inwardly projecting surfaces of the angle members 26. This structure may be seen in more detail in the sectional views of FIGS. 6 through 10.

It is to be understood that the peripheral groove achieved by the use of angle members 26 could also be constructed by other methods. For example, a single panel having edges formed to the same configuration as the edges of the angle members 26 could be secured to the back and bottom. Another method would be the provision of the channel integrally in the base member by double-folding the edges of the back 21 and bottom 22.

The base 20 provides a foundation for electronic equipment contained within the housing and mounted on vertical chassis. As shown in FIG. 2, signaling decoder chassis 30 and 31 stand on one edge in mounted position on the base 20, the mounting edges 32 and 37 of chassis 31 being adapted for bolting to the bottom 22. This will be described later in more detail.

The back 21 of the base 20 is adapted to carry electrical coupling and connector equipment such as the multiple socket connector 33. These couplers provide direct plug-in connection to the aircraft communication system. Gussets 27 are provided at the front and rear corners of the base 20 for bracing the bottom 22 and back 21 thereof.

The decoder units mounted on the base 20 are enclosed by means of envelope 40. This envelope is formed from sheet metal in a box-like fashion having a configuration to match the base 20 and engage the peripheral groove thereof. The envelope 40 includes a top panel 43 and side panels 41 and 42, best shown in FIG. 7 and FIG. 8, constructed of sheet metal having a thickness slightly smaller than the width of the peripheral groove of the base 20 to allow a sliding fit of these side panels in this groove. The top panel 43 will likewise slide fit in the groove along the top of the back 21. The lip edge 25 of the back 21 is inclined inwardly at an angle (shown in cross-section in FIG. 6) to facilitate this fit.

The top panel 43 may be provided with an opening 47 to permit access to electrical components mounted near the upper edge of the decoder unit chassis 30 and 31. Also provided in the top panel 43 are fastener holes 48, which are located so as to be in alignment with fastener holes 36 provided in the upper edge of chassis 30 and 31 when the envelope 40 is fully inserted on the base 20.

The front end of the envelope 40 is enclosed by a step-shaped control panel 44, also of sheet metal construction, having top and side edges 45 folded in at right angles to the main surfaces of the panel. The control panel 44 may be secured to the side panels 41 and 42 and the cover panel 43 by spot welds along these folded edges. On the upper vertical portion of the control panel 44 there are provided parallel rows of holes 46 through which are received smaller diameter control knobs 34 mounted on the front edge of the chassis 30 and 31. These holes permit removal and replacement of the envelope 40 without requiring removal of the control knobs. Each control knob hole is provided with a notch at the top thereof to permit viewing switch position numbers as they appear on the circular dials 35. A single fastener hole 49 is provided in the lower front portion of the control panel 44 and is located in alignment with fastener hole 28 of the base 20.

A cover plate 50 of sheet metal is provided which is slightly wider than the envelope 40. Downwardly projecting edges 51 and 52 on the sides of cover plate 50 are spaced so as to provide an overlapping seal when the cover plate is placed on the envelope 40. These edges also help in positioning the cover plate on the envelope. Two rows of fastener holes 53 are provided near either end of the cover plate 50. They are located so as to be in alignment with the fastener holes in the top panel 43 and with the corresponding fastener holes in the upper edges of the decoder unit chassis when the envelope 40 is fully inserted on the base 20 and the cover plate 50 is placed on the envelope 40.

The housing constructed in accordance with the invention is adapted to be quickly fastened together with simple standard aircraft quarter-turn screws, such as the quarter-turn screw 54 shown in FIG. 2. When the fastener holes 53 of the cover plate 50, the fastener holes 48 in the top panel 43 of the envelope 40 and the fastener holes 36 in the upper edge of the decoder chassis are all in alignment, the fastening screw 54 may be inserted therethrough and rotated 90° to a fully fastened position. Thus, with a simple twist of this single screw the cover plate 50, the envelope 40 and the decoder unit chassis 30 are secured in assembled relation. A larger quarter-turn screw 56 (FIG. 3) may be inserted through fastener hole 49 in the control panel 44 and through fastener hole 28 in the base 22 when the envelope 40 is fully on the base 20. Such fastening means at this point will help to tightly clamp the envelope into the grooved edges around the back 21 of the base 20.

Figures 3, 4:
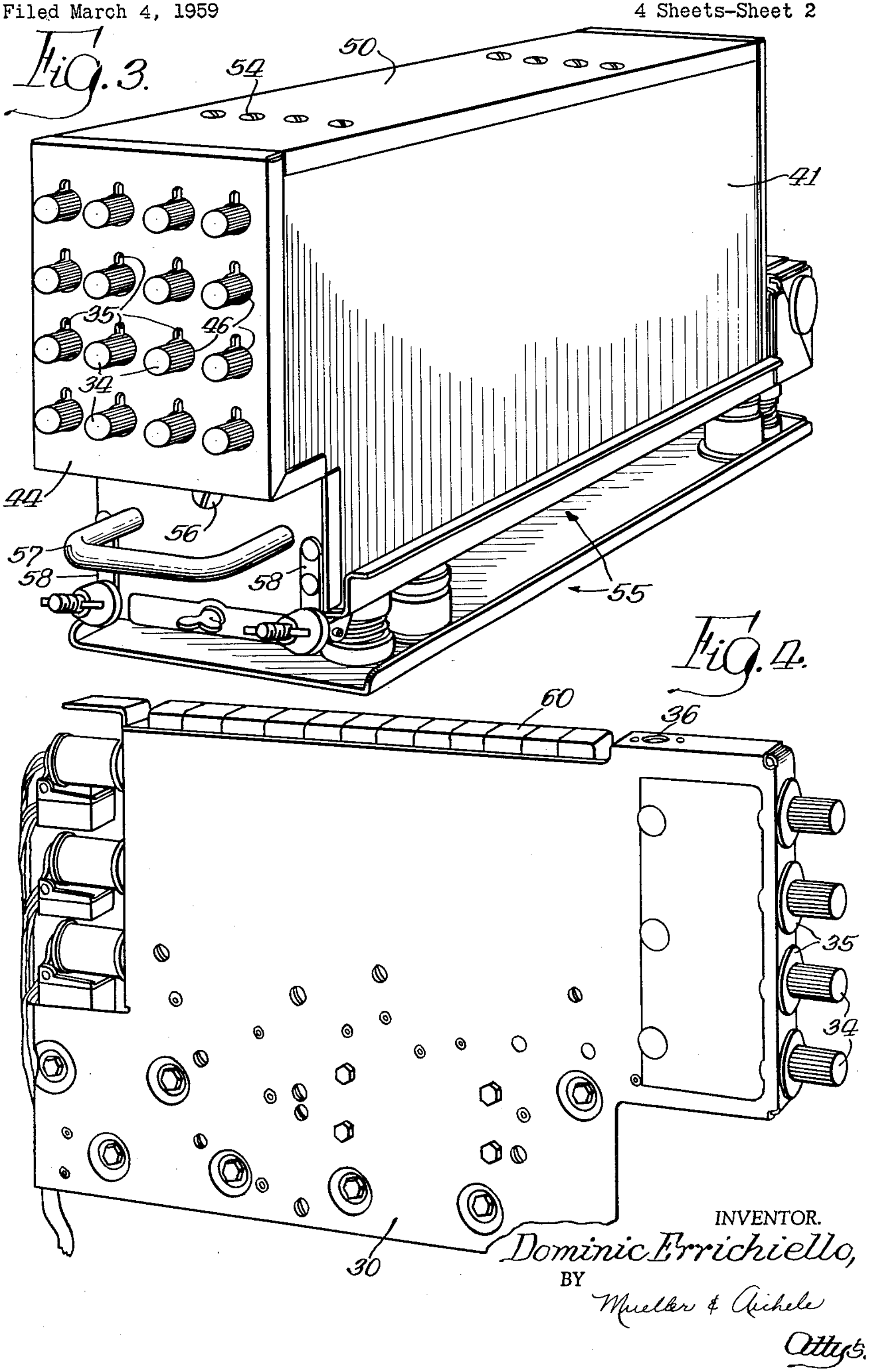
FIG. 3 is a perspective view illustrating the assembled housing of FIG. 2 and showing the housing mounted on a standard aircraft mounting rack.
FIG. 4 is a perspective view of a signaling chassis showing the free side thereof.

Referring now to FIG. 3, the embodiment of the housing of FIG. 2 with four units provided therein is illustrated completely mounted on a standard shock-mounting 55. The aircraft shock-mounting 55 is not particularly described since it is known art and is the standard means for carrying electronic equipment both in military and civilian aircraft. The housing includes brackets 58 secured to the mounting 55 by wing-nut clamping means provided as part of the standard aircraft mounting. The control knobs of four decoder units are shown as they protrude through the control knob holes of the control panel 44. As previously described, the position of the switches controlled by these knobs is indicated by numerals on the circular dial scales 35 as they line up with the notched opening provided at the top of each knob hole. A handle 57 is fitted to the lower portion of control panel 44 to provide means for handling the envelope 40 when assembling and disassembling the housing and for carrying the entire assembled housing.

FIG. 4 illustrates the back side of the decoder chassis 30. It is to be noted that the chassis is completely devoid of electronic components on the back side. This flush surface facilitates compact vertical mounting of a plurality of these decoder chassis in a side-by-side fashion within the housing.

Figures 5, 6:
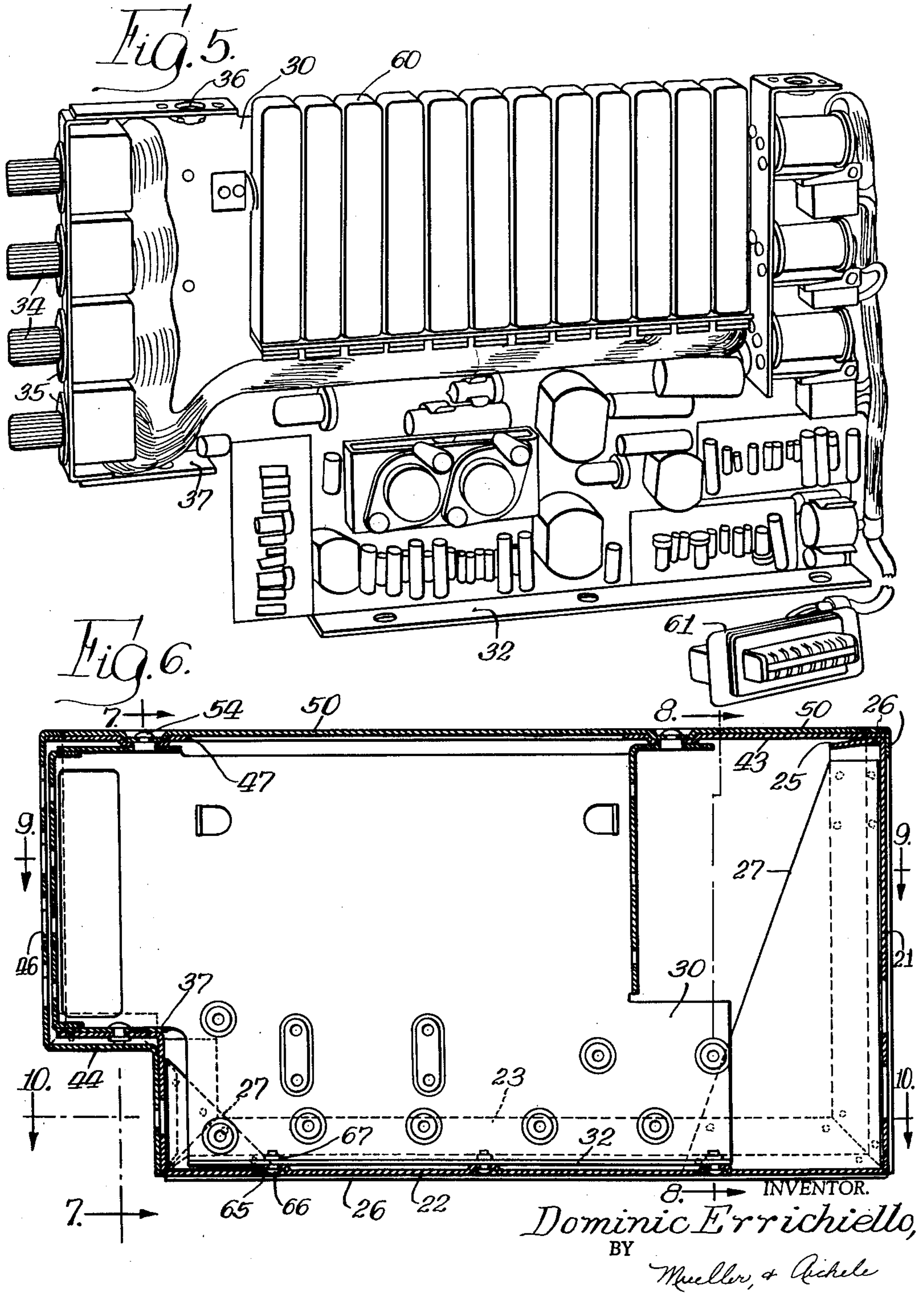
FIG. 5 is a perspective view illustrating the other side of the signaling chassis with the components mounted thereon.
FIG. 6 is an elevation view taken in section illustrating the assembled housing with a chassis mounted therein.
Figures 7, 8, 9, 10:
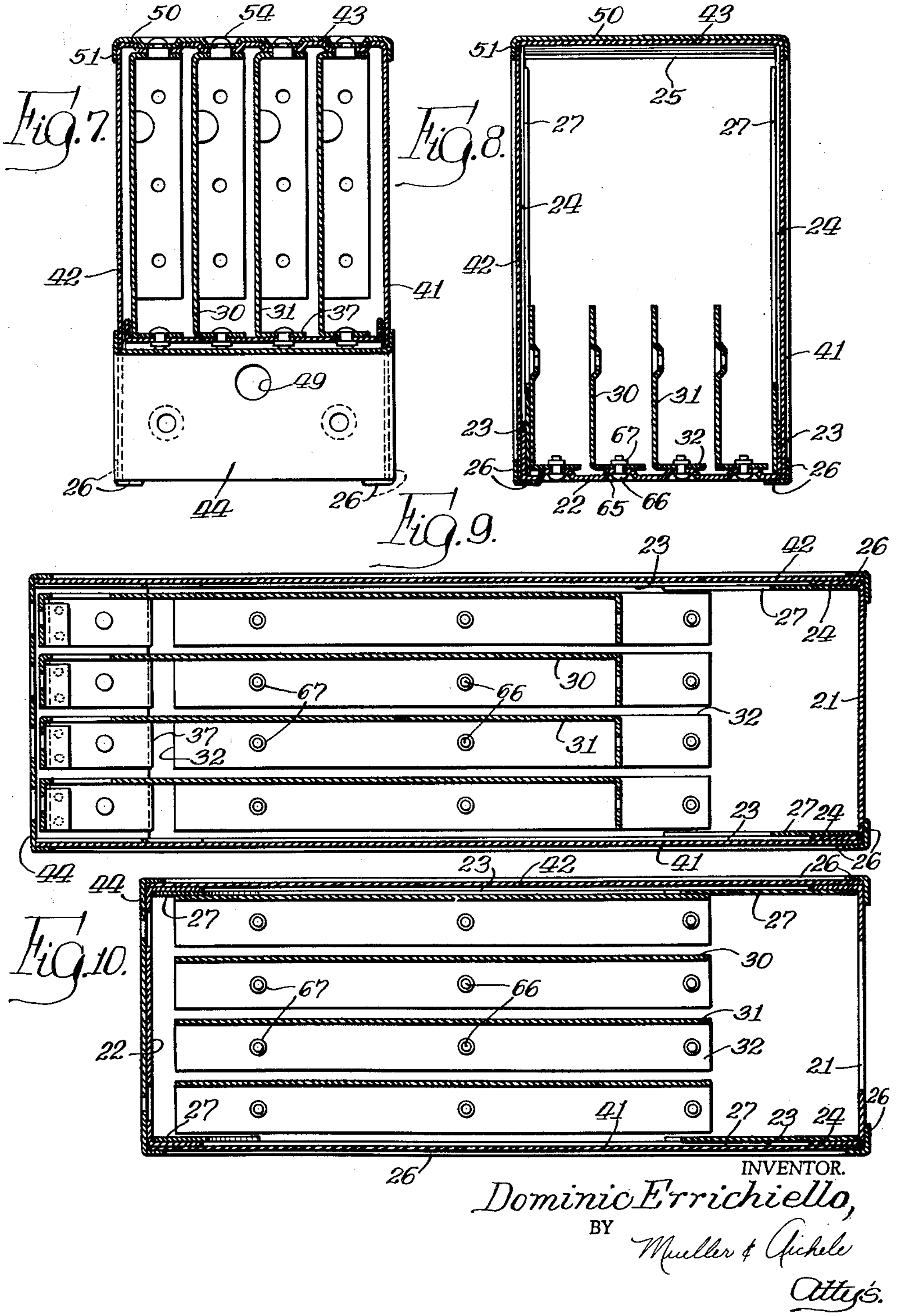
FIG. 7 is an elevation view taken in section on line 7—7 of FIG. 6 illustrating four chassis mounted in the assembled housing.
FIG. 8 is an elevation view taken in section on line 8—8 of FIG. 6.
FIG. 9 is a plan view taken in section on line 9—9 of FIG. 6.
FIG. 10 is a plan view taken in section on line 10—10 of FIG. 6.

The front side of decoder chassis 30 is illustrated in FIG. 5 with the complete assembly of component parts mounted thereon. Electro-mechanical selector units 60 are mounted in a row of 12 units on a shelf of chassis 30. This arrangement preserves the thin vertical design of the complete decoder unit and also provides a mounting of the selector units accessible through the opening in top panel 43. That is, each selector unit may be removed by merely removing the cover plate 50 without any further disassembly of the housing elements.

Each decoder chassis, as illustrated by the view of chassis 30 in FIGS. 4 and 5, provides mounting arrangements and circuit wiring for all the electronic components required for a decoder unit. As explained previously, the control knobs may be rigidly connected to switches within the chassis. Each decoder chassis is equipped with a multiple plug for connection with multiple socket units provided on the back 21 on the base 20 of the housing. By simply plugging the multiple plug 61 into its respective multiple socket, the entire decoder unit 30 is connected for operation. Thus, decoder units may be added or removed without disturbing the function of the remaining units in the housing, and may be individually tested and serviced even when removed from the housing.

The mounting of the decoder chassis 30 within the housing is illustrated in detail in FIG. 6. The bottom 22 of base 20 is provided with rows of stamped bosses 65 having a center hole therethrough to accommodate a mounting bolt 66. Another row of mounting holes is provided on front step of base 20. Mounting holes provided in the mounting edges of 32 and 37 of the chassis 30 are located in alignment with the mounting holes of the base 20. Mounting bolts 66 extend through the aligned holes and together with lock nuts 67 fasten the decoder chassis on the base of the housing. This mounting will support the decoder unit when the top thereof is unsecured since the decoder chassis is sufficiently rigid to be supported by the integral mounting edges. Thus, when the quarter turn fasteners and cover plate 50 are removed for servicing there is no danger of the decoder units toppling into one another. The mounting bosses pressed in the bottom 22 serve to recess the bolt heads so that the bottom 22 will have a flush outside surface. This allows the base 20 to slide freely in a drawer-like manner on the mounting 55. The mounting bosses of the bottom 22 also serve to elevate the decoder chassis 30, thereby forming a gap between the chassis and the bottom of the base for better air circulation within the housing.

FIGS. 7 through 10 illustrate in sectional views the housing constructed in accordance with the invention with four decoder chassis mounted therein. Several additional features of the invention may be seen from these views to fulfill the stated objects of the invention. By mounting all components on one side of a chassis, and then mounting these chassis on edge in a vertical position, a compact housing and chassis arrangement is achieved. The vertical arrangement of the chassis allows a high density of electronic components to be packaged within the housing without danger of too much heat being generated therein, since each chassis forms a heat dissipating vertical radiator surface more easily cooled by convection air currents. Each decoder chassis serves as both a mechanical and electrical shield between the components mounted thereon and the components mounted within the adjacent units. An extremely strong housing construction is achieved since each chassis is utilized as a beam member therein. This allows the use of lightweight sheet metal in the construction of the housing panels. The simplicity of overall design combined with housing material which can be easily worked provides a low cost housing structure.

It will be seen from the foregoing description that the housing can be easily disassembled in progressive stages. The vibrator units may be serviced merely by removing cover plate 50. With the envelope 40 fastened to the base 20 solely by means of the single quarter turn fastener 56, the housing is securely intact. Should the space be limited in front of the equipment, the envelope 40 may be liftably removed after it is pulled forward a sufficient distance to clear the front step of base 20. From this point it also could be pivoted backwards to remove it from the base. The control knobs may be securely fastened to the decoder chassis since they need not be removed to remove the envelope 40. Thus time is saved in servicing the equipment and the accuracy of the control knob settings is preserved. By combining the drawer features of the envelope with both the grooved edge of the base 20 and the structural features of vertically mounted chassis, a quick fastening well-sealed housing for electronic equipment is provided.

I claim:

1. A housing for electronic equipment including in combination, a base having a bottom portion, a back portion and a front portion, said bottom and back portions having grooved side edges and said back portion having a grooved top edge, a removable envelope having a top panel with an opening for access therein, two spaced side panels and a front control panel, said side panels and said top panel of said envelope having edges shaped to provide a sliding fit in the grooved edges of said base, a removable top cover, and first and second fastening means, said first fastening means providing secure engagement between said front control panel of said envelope and said front portion of said base for removably holding said envelope in said grooved edges of said base to thereby hold said housing in assembled relation, said second fastening means providing secure engagement between said top panel and said top cover.

2. A housing for electronic equipment including in combination, a base having a bottom portion and a back portion with the side edges thereof and the top edge of said back portion bent inwardly, right angle means shaped to surround the side edges of said bottom and back portions and the top edge of said back portion to form grooved edges therewith when secured to the periphery of said bottom and back portions, a removable envelope having a top panel with an opening for access therein, two spaced side panels and a front control panel, said side panels and said top panel of said envelope having edges shaped to provide a sliding fit in the grooved edges of said base, a removable top cover plate, a single fastening first means for providing secure engagement between said front control panel of said envelope and said base for removably holding said envelope in said grooved edges of said base so that both sides of said grooved edges overlap said edges of said envelope to prevent dirt from entering said housing and to hold the same in assembled relation, and second fastening means for providing secure engagement between said top panel of said envelope and said top cover plate.

3. A housing and chassis arrangement for electronic equipment including in combination, a base adapted to carry electronic equipment thereon and including a bottom portion and a back portion, said bottom and back portions having side edges and said back portion having a top edge, a plurality of metallic chassis units having electrical components thereon, said metallic chassis units being arranged adjacent to each other and individually mounted on one edge and extending generally normal to said bottom portion of said base whereby said units are mechanically and electrically shielded from one another, a removable envelope having a top panel with an opening for access therein, a front control panel and spaced side panels, said side panels and said top panel being shaped to be received on the edges of said base when said envelope is placed thereon, a top cover plate, and fastening means engaging said top panel, top cover plate, and the edge of each chassis member opposite said one edge to further support said chassis members and to secure said envelope on the edges of said base.

4. A housing and chassis arrangement for electronic equipment including in combination, a base adapted to carry electronic equipment thereon and having a bottom portion joined at the rear end thereof to a back portion, said bottom and back portions having side edges and said back portion having a top edge bent inward at least normal to the main surfaces thereof, a mating member slightly larger than said base having surfaces and edges shaped to surround the respective surfaces and edges of said bottom and back portions of said base, said mating member being mounted on the outer surfaces of said bottom and back portions to form a grooved edge around the sides and top thereof, a plurality of chassis units having electrical components thereon, said chassis members being arranged upright and adjacent to each other and individually mounted on one edge thereof to said bottom portion of said base, a removable envelope having a top panel, a front control panel and spaced parallel side panels, said side panels and said top panel being shaped to be slidably received in the grooved edges of said base when said envelope is placed thereon, and fastening means engaging said top panel and the edge of each chassis member opposite said one edge to further support and incorporate into the housing said chassis members and to secure said envelope in the grooved edges of said base.

5. A housing and chassis arrangement for electronic equipment including in combination, a base adapted to carry electronic equipment thereon and having a bottom portion joined at the rear end thereof to a back portion, said bottom and back portions having inwardly bent side edges and said back portion having an inwardly bent top edge, channel members secured to said base and having edges shaped to surround the respective edges of said bottom and back portions of said base to form a grooved edge around the sides and top thereof, a plurality of substantially rectangular chassis members having electrical components mounted on one side thereof to form relatively thin chassis units, said chassis members being arranged adjacent to each other and individually mounted on one edge thereof to said bottom portion of said base and extending normally therefrom, a removable envelope having a top panel, a front control panel and spaced side panels, said side panels and said top panel being shaped to be slidably received in the grooved edges of said base when said envelope is placed thereon, fastening means engaging said top panel and the edge of each chassis member opposite said one edge to further support and incorporate into the housing said chassis members and to secure said envelope in the grooved edges on the bottom portion of said base, and fastening means for providing engagement between said front control panel of said envelope and said base to additionally secure said envelope in the grooved edges of the back of said base.

6. A housing and chassis arrangement for electronic equipment including in combination, a base adapted to carry electronic equipment thereon and including a bottom portion and a back portion, said bottom and back portions having side edges and said back portion having a top edge, a plurality of chassis members having electrical components thereon, said chassis members being arranged upright and adjacent to each other and individually mounted on one edge to said bottom portion of said base to extend generally normal therefrom, a removable envelope having a top panel, a front control panel and spaced side panels, said side panels and said top panel being shaped to be slideably received on the edges of said base when said envelope is placed thereon, said top panel having at least one opening therein to provide access to the top of each chassis member enclosed by said envelope, a plate for covering said opening when received on said top panel, and fastening means engaging said plate and the edge of each chassis member opposite said one edge for simultaneously securing said plate on said top panel, clamping said envelope on said base and further supporting and incorporating into the housing structure said chassis members.

7. A housing and chassis for electronic communication equipment for use in aircraft including in combination, a base adapted to carry electronic equipment thereon and including integral front, bottom and back portions, the side edges of said base being bent inward normal to the main surfaces thereof and the top edge of the back portion of said base being bent inward at an acute angle to the back portion, a right angle flange structure shaped to encompass the side edges of said base and the top edge of said back portion to form a grooved edge therewith when secured to the periphery of said bottom and back portions of said base, a plurality of substantially channel shaped chassis members adapted to carry electrical components on the inside surfaces thereof, said chassis members being arranged adjacent to each other and individually mounted on one edge to said bottom portion of said base and extending normally therefrom, each of said chassis members being provided with means for individual connection to the aircraft communication system, a removable envelope having parallel side panels spaced and connected by a top panel and a step-shaped front control panel, said side panels and said top panel being shaped to be slidably received in the grooved edges of said base when said envelope is placed thereon, said top panel having at least one opening therein to provide access to the top of each chassis member enclosed by said envelope, a cover plate for said opening having side edges bent inward normal to the main surface thereof to enclose the top panel when received thereon, fastening means engaging said cover plate and the edge of each chassis member opposite said one edge to incorporate said chassis member into the housing structure, to secure said cover plate to said top panel, and to clamp said envelope on said base, and fastening means for providing engagement between said front control panel of said envelope and said front portion of said base to further secure said envelope in said grooved edges of said base.

8. A housing and chassis arrangement for electronic equipment including in combination, a base adapted to carry electronic equipment including a bottom portion and a back portion, said bottom and back portions having grooved side edges and said back portion having a grooved top edge, a plurality of chassis units having electrical components flatwise mounted therein and having control means mounted thereon extending from the front end thereof, said chassis units being arranged adjacent to each other and individually mounted on one edge to said bottom portion of said base to extend generally normal therefrom, a removable envelope having a top panel, a front control panel and spaced side panels, said front control panel having openings to receive said control means therethrough whereby said envelope may be placed on or removed from said chassis units in said base without removing or altering said control means, said side panels and said top panel being shaped to be slidably received in the grooved edges of said base when said envelope is placed thereon, and fastening means engaging said top panel and the edge of each chassis member opposite said one edge whereby each chassis unit is further supported in the housing and is also mechanically incorporated into the housing structure, and whereby said envelope is secured on said base without altering or removing said control means.

9. Electronic equipment including in combination, a base adapted to carry electronic equipment thereon and being comprised of a bottom portion joined at the rear end thereof to a back portion, the side edges of said bottom and back portions and the top edge of said back portion having channels therein, a plurality of substantially channel shaped metallic chassis units adapted to carry electrical components on the inside thereof and having control means mounted on the front end thereof, said chassis units being arranged adjacent to each other and individually and perpendicularly mounted on one edge to said bottom portion of said base whereby said units are mechanically and electrically shielded from one another, each of said chassis members being independently wired and provided with means for separate connection to an external electrical system, a removable envelope having a top panel, a front control panel and spaced side panels, said front control panel having openings therein to receive said control means whereby said envelope may be placed on or removed from said base without removing or altering said control means, said side panels and said top panel being shaped to be slidably received in the channel edges of said base when said envelope is placed thereon, and fastening means engaging said top panel and the edge of each chassis member opposite said one edge to further support and mechanically incorporate into said base and envelope said chassis units and also to secure said envelope in said channels of said base.

References Cited in the file of this patent

UNITED STATES PATENTS

| | | |
|---|---|---|
| 2,602,842 | Morris | July 8, 1952 |
| 2,731,555 | Beck | Jan. 17, 1956 |
| 2,735,964 | Grieve | Feb. 21, 1956 |
| 2,895,087 | Lieb | July 14, 1959 |
| 2,951,185 | Buck | Aug. 30, 1960 |